Dec. 14, 1926.

G. F. CRASS 1,610,999

VEHICLE BRAKE

Filed Feb. 28, 1924    2 Sheets-Sheet 1

Inventor
George F. Crass
By
F. K. Bryant.
Attorney.

Dec. 14, 1926.  
G. F. CRASS  
VEHICLE BRAKE  
Filed Feb. 28, 1924  
1,610,999  
2 Sheets-Sheet 2
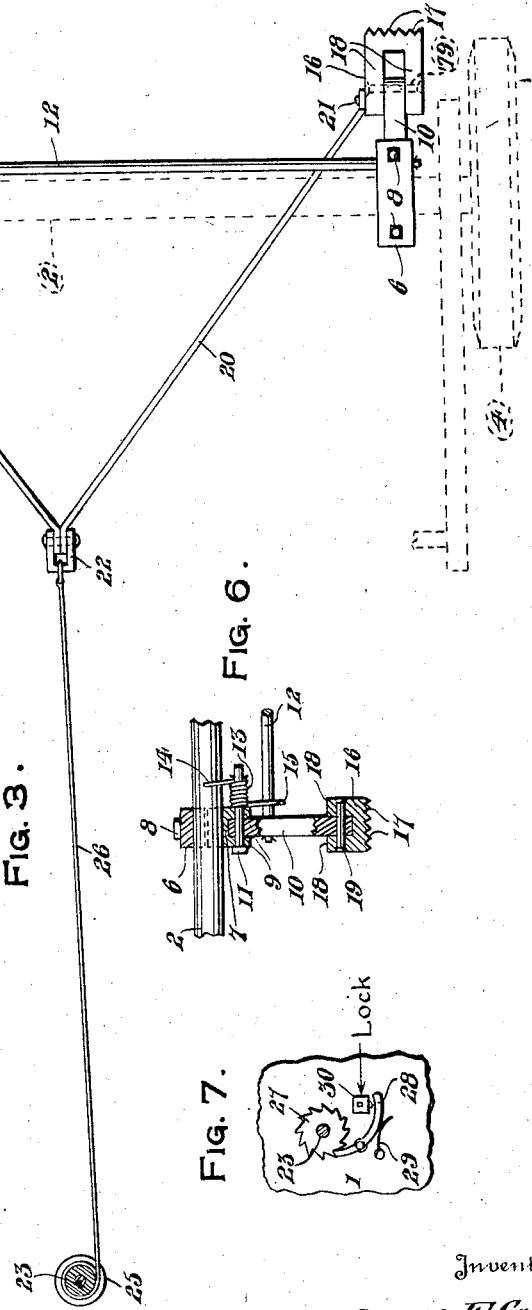
Inventor  
George F. Crass  
By  
J. S. Bryant  
Attorney Patented Dec. 14, 1926.

1,610,999

UNITED STATES PATENT OFFICE.

GEORGE F. CRASS, OF ITHACA, NEW YORK, ASSIGNOR OF ONE-HALF TO LLEWELLYN C. GREENLEAF, OF ITHACA, NEW YORK.

VEHICLE BRAKE.

Application filed February 28, 1924. Serial No. 695,737.

This invention relates to certain new and useful improvements in vehicle brakes and particularly to a type capable of being installed upon a motor vehicle and adapted for direct engagement with the ground for braking the vehicle.

The primary object of the invention is to provide a vehicle brake wherein brake shoes normally maintained elevated by spring devices and supported upon the rear axle of a vehicle are adapted to be manually lowered into engagement with the ground for arresting movement of the vehicle and if desired to elevate the rear end of the vehicle from the ground to permit free access to the rear wheels, for such purposes as changing tires or the like.

With the above and other objects in view that will become apparent as the nature of the invention is better understood, the same consists of the novel form, combination and arrangement of parts hereinafter more fully described, shown in the accompanying drawings and claimed.

Figure 1:
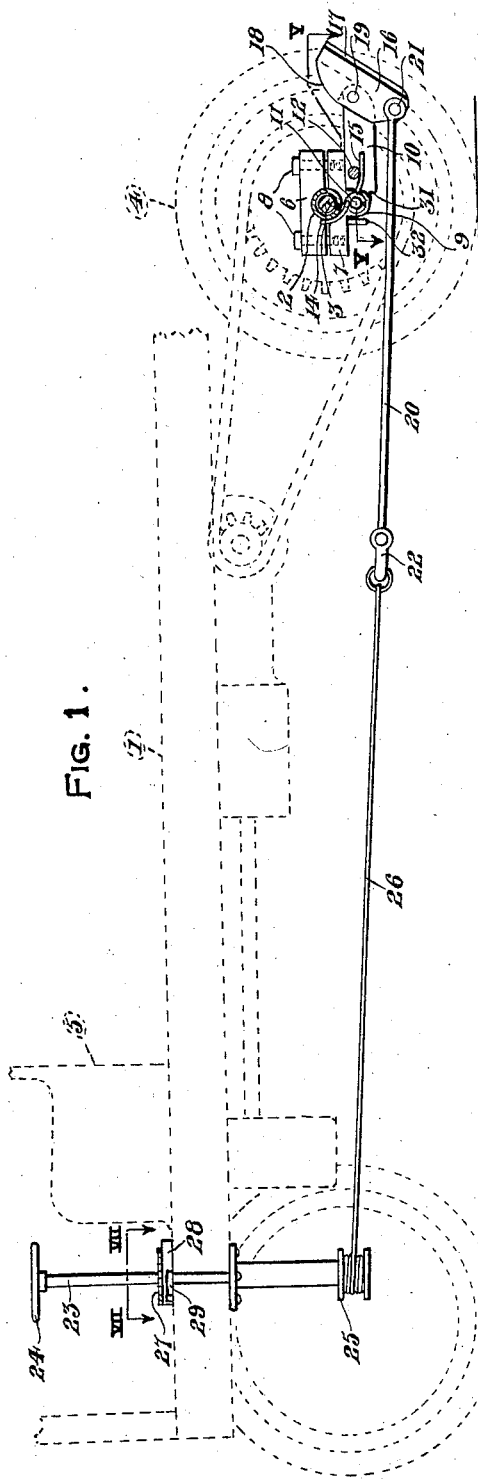
Figure 2:
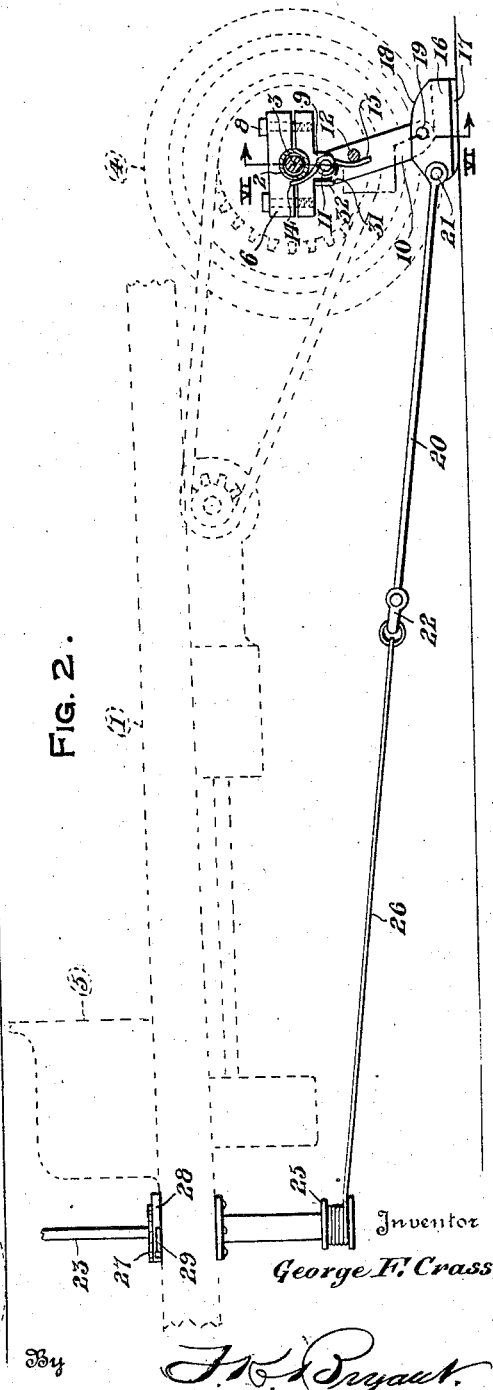

In the drawings, wherein like reference characters designate corresponding parts throughout the several views, Figure 1 diagrammatically illustrates by dotted lines, a fragmentary side elevational view of a motor vehicle equipped with the brake mechanism forming the subject of this application with the brake mechanism elevated to its inoperative position, Figure 2 is a view similar to Fig. 1 showing the brake mechanism lowered to its operative position with the brake shoes thereof engaging the ground and the rear wheels of the vehicle elevated from the ground, Figure 3 is a fragmentary top plan view showing the brake mechanism supported upon the rear axle of the vehicle, Figure 4 is a fragmentary elevational view showing the clamp members carrying one of the brake shoes mounted upon the rear axle and the spring device for holding the brake shoe in an elevated position, Figure 5 is a horizontal detail sectional view taken on line V—V of Fig. 1, Figure 6 is a vertical detail sectional view taken on line VI—VI of Fig. 2, and Figure 7 is a horizontal detail sectional view taken on line VII—VII of Fig. 1.

Referring more in detail to the accompanying drawings, a motor vehicle is illustrated by dotted lines in Figs. 1 to 3 and includes the floor board 1 suitably supported above the rear axle housing 2 that encloses the axle 3 upon the opposite ends of which the rear wheels 4 are mounted.

The brake mechanism includes ground engaging brake shoes that are supported upon the axle housing 2 and are normally retained in an elevated position by spring devices associated therewith, the brake shoes being operable from a point adjacent the driver's seat 5 to be shifted into engagement with the ground for braking the vehicle and also for elevating the rear end thereof as illustrated in Fig. 2 when desired. A ground engaging brake shoe is associated with each end of the housing 2 at points spaced inwardly of the wheels 4 and the mounting therefor includes a pair of clamping bars 6 and 7 enclosing the housing and bolted together as at 8, the clamping bar 7 being disposed beneath the housing as shown in Figs. 1 and 2. The lower clamping bar 7 carries a pair of depending spaced lugs 9, shown more clearly in Fig. 6 and between which the upper end of the leg 10 is pivotally mounted upon the pin 11 that projects laterally of the lugs 9 toward the center of the housing. A rod 12 rigidly connects the leg 10 and a coil spring 13 secured to the projecting end of the pin 11 has one end 14 thereof engaging the axle housing 2 while the other end 15 engages the rod 12 for placing the legs 10 under tension and holding the same in an elevated position as illustrated in Fig. 1.

A ground engaging brake shoe 16 having a corrugated lower face 17 is pivotally mounted upon the outer end of each leg 10, the upper side of the brake shoe 16 being longitudinally grooved to provide side walls 18 with the lower end of the leg 10 received therebetween and pivotally mounted upon the pin 19 extending through the side walls 18 of the shoe.

The operating means for the brake mechanism includes a pair of forwardly converging rods 20 connected at their rear ends as at 21 to the respective brake shoes 16 while the forward meeting ends thereof are attached to a clevis 22. A vertical shaft 23 extending through the floor board 1 forwardly of the driver's seat 5 and having an operating handle or wheel 24 upon its upper end is journaled through the floor board and carries a drum 25 upon its lower end. A cable 26 has one end anchored to the clevis 22 while the other end thereof is secured to the drum 25 and is adapted to be wound thereon during the lowering movement of the brake shoes 16 into engagement with the ground. A ratchet wheel 27 is fixed to the shaft 23 above the floor board 1 and is engaged by the pivoted pawl 28 that is spring pressed as at 29 so that when the shaft 23 is operated to lower the brake shoes, the spring pressed pawl 28 engaging the ratchet fixed to the shaft 23 will hold the brake shoes in their lowered position. A key operated lock 30 is mounted upon the floor board 1 adjacent the outer end of the tensioned pawl 28 and is adapted to have its bolt projected into engagement with the pawl to hold the latter against movement and in engagement with the ratchet wheel 27 for locking the brake shoes 16 in a lowered ground engaging position to prevent accidental movement thereof and also providing an efficient lock for the vehicle.

The springs 13 associated with the axle housing 2 and the cross rods 12 connecting the legs 10 normally hold the legs and brake shoes 16 in the elevated position shown in Fig. 1. In applying the brake shoes, or lowering the same to the ground engaging position as shown in Fig. 2, the shaft 23 is rotated to wind the cable 26 upon the drum 25 carried upon the lower end thereof, this movement pulling the rods 20 forwardly and lowering the legs 10 and brake shoes 16, such lowering movement of the legs being limited by the shoulders 31 formed on the legs adjacent the upper ends thereof engaging the stop pins 32 depending from the lower clamping bar 7 as more clearly illustrated in Figs. 1 and 2. The pawl and ratchet mechanism prevent retrograde movement of the shaft 23 and the brake shoes effectively engage the ground for arresting movement of the vehicle. After the brake shoes have engaged the ground, it is possible to continue operation of the shaft 23 for elevating the rear end of the vehicle as shown in Fig. 2, thereby permitting free access to the rear wheels 4 for the purpose of changing tires or other repair work. When the vehicle is to remain standing for any length of time without an attendant, the lock 30 may be operated to cause its bolt to be moved into engagement with the tensioned ball 28 for locking the same in engagement with the ratchet wheel 27 and securely holding the brake shoes in a ground engaging position.

While there is herein shown and described the preferred embodiment of the present invention, it is nevertheless to be understood that minor changes may be made therein without departing from the spirit and scope of the invention as claimed.

What is claimed as new is:—

In a vehicle brake, the combination with the rear axle housing of an automobile, of clamping bars secured to the housing adjacent each end thereof, a pivoted leg depending from each of the clamping bars, a cross rod connecting the legs, a brake shoe having longitudinal grooves on its ground engaging face pivoted to the outer end of each leg, a coil spring associated with the pivotal mounting of each leg, having one end thereof engaging the axle housing and the other end engaging the cross rod to hold the brake shoes normally elevated, a pin depending from each pair of clamping bars, a shoulder on each leg, adapted to engage the pin to limit downward movement of the brake shoes, a rod connected to the forward end of each shoe, a clevis connecting the forward ends of the rods, a vertical shaft journaled adjacent the forward end of the automobile, a drum secured to the lower end of the shaft, a cable connection between the drum and clevis, pawl and ratchet mechanism to prevent retrograde movement of the shaft, a lock for holding the pawl and ratchet mechanism against movement with the brake shoes in locked position and a hand wheel mounted on the shaft for operating the device.

In testimony whereof I affix my signature.

GEORGE F. CRASS.